(12) United States Patent
Young

(10) Patent No.: US 9,896,625 B2
(45) Date of Patent: Feb. 20, 2018

(54) APPARATUS FOR PYROLYZING WASTE PLASTIC INTO FUEL

(71) Applicant: EVP TECHNOLOGY LLC. USA, Taipei (TW)

(72) Inventor: James Young, Taipei (TW)

(73) Assignee: EVP TECHNOLOGY LLC. USA, Taipei (TW)

( * ) Notice: Subject to any disclaimer, the term of this patent is extended or adjusted under 35 U.S.C. 154(b) by 516 days.

(21) Appl. No.: 14/558,359

(22) Filed: Dec. 2, 2014

(65) Prior Publication Data

US 2015/0152333 A1 Jun. 4, 2015

(30) Foreign Application Priority Data

Dec. 2, 2013 (TW) .............................. 102222575 U
Jan. 2, 2014 (TW) .............................. 103200021 U

(51) Int. Cl.
| | | |
|---|---|---|
| C10B 53/07 | (2006.01) | |
| C10B 47/02 | (2006.01) | |
| C10G 1/10 | (2006.01) | |
| C10L 5/36 | (2006.01) | |
| C10L 5/40 | (2006.01) | |

(52) U.S. Cl.
CPC .............. *C10B 53/07* (2013.01); *C10B 47/02* (2013.01); *C10G 1/10* (2013.01); *C10L 5/361* (2013.01); *C10L 5/403* (2013.01); *C10L 5/406* (2013.01); *C10G 2300/1003* (2013.01); *C10G 2400/02* (2013.01); *C10G 2400/04* (2013.01); *C10G 2400/08* (2013.01); *C10L 2200/0469* (2013.01); *C10L 2270/023* (2013.01); *C10L 2270/026* (2013.01); *C10L 2270/04* (2013.01); *C10L 2290/02* (2013.01); *C10L 2290/543* (2013.01); *Y02E 50/30* (2013.01); *Y02P 20/143* (2015.11)

(58) Field of Classification Search
CPC ........... C10B 47/02; C10B 53/07; C10G 1/10; C10G 2300/1003; C10G 2400/02; C10G 2400/04; C10G 2400/08; C10L 5/361; C10L 5/403; C10L 5/406; Y02E 50/30; Y02P 20/143
See application file for complete search history.

(56) References Cited

U.S. PATENT DOCUMENTS

| | | | | |
|---|---|---|---|---|
| 5,817,701 A | * | 10/1998 | Leviness | .................. B01J 38/48 502/21 |
| 2007/0179326 A1 | * | 8/2007 | Baker | ..................... C10B 47/18 585/241 |
| 2013/0118885 A1 | * | 5/2013 | Sarker | ..................... C10B 53/07 201/8 |

* cited by examiner

*Primary Examiner* — Brian McCaig
(74) *Attorney, Agent, or Firm* — Muncy, Geissler, Olds & Lowe, P.C.

(57) ABSTRACT

An apparatus pyrolyzes waste plastics into fuel. The apparatus categorizes the waste plastic, and processes the categorized waste plastic to obtain kerosene, diesel fuel, gasoline etc. The apparatus includes a first heat exchange tank, a rough fuel storage tank, a second heat exchange tank, a diesel storage tank, and a kerosene storage tank. Combustible gas is extracted from the tanks via outlets thereof and stored in a gas storage tank. The combustible gas stored in the gas storage tank is fed into a combustion chamber of a pyrolysis furnace of the apparatus. A fuel-water separate tank is connected to the bottom of the rough fuel storage tank to separate fuel from water. The separated fuel is recycled into the combustion chamber to be burned again. Recycled paper with residual plastic films thereon has to be compressed into grains to facilitate a feeding operation.

3 Claims, 7 Drawing Sheets

APPARATUS FOR PYROLYZING WASTE PLASTIC INTO FUEL

FIELD OF THE INVENTION

The invention is about an apparatus for fuel generation. To be more specific, the invention is about an apparatus for pyrolyzing waste plastics into fuel. Operating procedures of the apparatus consist of categorizing waste plastic, an input apparatus, a pyrolysis furnace associated with a combustion chamber, a catalytic gas tank associated with a first temperature controller, a first heat exchange tank associated with a second temperature controller, a rough fuel storage tank, a refined fractionation tank associated with a third temperature controller, and being processed by a second heat exchange tank associated with a forth temperature controller to generate fuel. The generated fuel is stored in all levels of fuel storage tanks respectively. Wherein the apparatus, there is a combustible gas outlet configured respectively at the top of the first heat exchange tank, the rough fuel storage tank, the second heat exchange tank, the diesel storage tank and kerosene storage tank. After extracting and pressurizing by connecting with a gas pump through a pipe, the apparatus inputs gas to a gas storage tank. Combustible gas in the gas storage tank can be input into the combustion chamber of the pyrolysis furnace to burn for the purpose of recycling combustible gas. The bottom of the rough fuel storage tank is connected with a fuel-water separate tank to process the portion of fuel-water mixture. The fuel-water separate tank can separate fuel from water to output waste fuel. After drawing by a fuel pump through a waste fuel pipe, the output waste fuel is guided into the combustion chamber of the pyrolysis furnace to burn again for the purpose of recycling waste fuel. About residual plastic films of recycled paper, since their shapes are particularly difficult to collect and be processed, it is easier to compress the plastic films of recycled paper into grains in order to facilitate the input operation.

DESCRIPTION OF RELATED ART

With regard to waste plastics, they are categorized into PET bottles (PET), waste pipe (PVC), plastic bags (PE, PP), packing foam, Styrofoam (EPS), plastic containers (HDPE), plastic rope, woven (PP), nylon thread (Nylon), industrial composite plastic (PE, PS, ABS), plastic films of recycled paper(PE), and so on. Small portion of waste plastics such as industrial composite plastic (PE, PS, ABS) can be reused. Recently, re-entering waste plastics into the manufacturing factories via specific recycling methods to generate secondary plastic products is realized by shaping and processing the waste plastics via, for instance, plastic injection molding machines, plastic extrusion molding machine, etc. Since demand of secondary plastic products is far less than the production of waste plastics, industrial composite plastic which cannot be reused ore recycled in time and other types of waste plastics cannot be processed into secondary plastics are dumped into landfills or delivered to a incinerator to destroy. Directly burning waste plastics is really unwise, since that not only wastes resources but causes air pollution. Waste plastics are pyrolyzed in anaerobic condition and heat-exchange process via a pyrolysis furnace to produce primary product which is fuel and distribute excess oil and gas. The excess oil and gas can cause environmental problems such as air pollution and odor, etc. Accordingly, it is critical to have solutions to solve the aforementioned problems. The present invention is invented to aim at providing a recycling apparatus which pyrolyzes waste plastics produced by household and industries into petroleum oil via pyrolysis furnaces. Moreover, the present invention recycles the excess gas and oil originally scattered in the air and turns them into by-products to join queues of production.

SUMMARY OF THE INVENTION

An apparatus for pyrolyzing waste plastics into fuel and inputting the categorized wasted plastic is provided, which comprises: an input devise; a pyrolysis furnace associated with a combustion chamber and connected to the input device; a catalytic gas tank associated with a first temperature controller and connected to the pyrolysis furnace; a first heat exchange tank associated with a second temperature controller and connected to the catalytic gas tank; a rough fuel storage tank connected to the first heat exchange tank; a refined fractionation tank associated with a third temperature controller and connected to the rough fuel storage tank; and an equipment comprising a second heat exchange tank associated with a forth temperature controller, the equipment being connected to the refined fractionation tank. The input device further includes a tank for inputting waste plastic, and two driven and mutually parallel stirring reels disposed within the tank to stir the waste plastic to be fed into a preheat pipe disposed beneath the tank. The preheat pipe includes a heater and a motor-driven propeller for inputting materials. The pyrolysis furnace is a two-layered structure having an outer layer surrounding an inner layer with a spacing formed therein between. There is an inlet disposed at the upper portion of the pyrolysis furnace, a hot air outlet disposed at the top end of the outer layer of the pyrolysis furnace, a gas pipeline disposed at the top end of the inner layer of the pyrolysis furnace; two combustion chambers disposed at two corresponding sides of the pyrolysis furnace to heat up the spacing; and a residue tank disposed at the bottom of the pyrolysis furnace. A gas generated by the pyrolysis furnace is fed by the gas pipeline into the catalytic gas tank to process and then into the first heat exchange tank to obtain rough fuel, and the rough fuel is stored in the rough fuel storage tank and then input to the refined fractionation tank which is formed with an additive inlet. The rough fuel is fractionated and then processed by the second heat exchange tank to produce refined fuel. The refined fuel is controlled by a valve to be stored in a diesel fuel storage tank, kerosene storage tank, or a gasoline storage tank in a fuel storage area, respectively.

In an embodiment, a residual combustible gas, which is pyrolyzed, catalyzed, heat exchanged, and refined fractionated, is recycled by a combustible gas recycling device. A combustible gas outlet of the combustible gas recycling device is connected to the top of at least one of the first heat exchange tank, the rough fuel storage tank, the second heat exchange tank, the diesel fuel storage tank, and the kerosene storage tank, and connected to a pump through a combustible gas pipe for inputting to a gas tank the residual combustible gas contained in the at least one of the first heat exchange tank, the rough fuel storage tank, the second heat exchange tank, the diesel fuel storage tank, and the kerosene storage tank after extracting and pressurizing; and the residual combustible gas is fed into the combustion chamber of the pyrolysis furnace through the gas tank to burn again for the purpose of recycling fuel gas.

In another embodiment, during the pyrolysis, catalysis, heat exchange, and refined fractionation process, a portion of the refined fuel is mixed with water to become a waste fuel. The waste fuel can be recycled through a waste fuel recycling device. The waste fuel recycling device has pipes connected to outlets disposed at the bottom of the rough fuel storage tank, the diesel fuel storage tank, and the kerosene storage tank for discharging the waste fuel through the outlets. The other ends of the pipes are connected with a fuel-water separating tank, and the bottom of the fuel-water separating tank has a waste water outlet and a waste fuel outlet. The waste fuel outlet of the fuel-water separate tank is connected with a waste fuel pipe, the waste fuel pipe is connected with a pump to input the waste fuel into the pyrolysis furnace for burning the waste fuel so as to recycle the waste fuel.

In yet another embodiment, the apparatus further comprises a structure that for handling grains of residual plastic films of recycled papers. The structure comprises a mixer for accommodating the residual plastic films of recycled papers and mixing them with water, wherein the mixer includes a tank and a driven stirring rod inserted into the rank; and a dehydrator having an inner tank and an outer tank are for the residual plastic films of recycled papers which are stirred evenly by the stirring rod and diluted to pure plastic to be fed thereinto, wherein the inner tank is for accommodating the residual plastic films of recycled papers and driven to generate centrifugal force; and a compressor for compressing the plastic films of recycled papers and having a platform formed with a plurality of mold cavities and a driven pressure plate, wherein the driven pressure plate is used to heavily compress the plastic films of recycled papers from the dehydrator into grains via the mold cavities. The compressing process not only greatly compresses the volume of the plastic films of recycled papers but also makes it convenient to transport, store, and comply the plastic films of recycled papers with the operating specifications for feeding the pyrolysis furnace to pyrolyze and output all levels of fuel.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
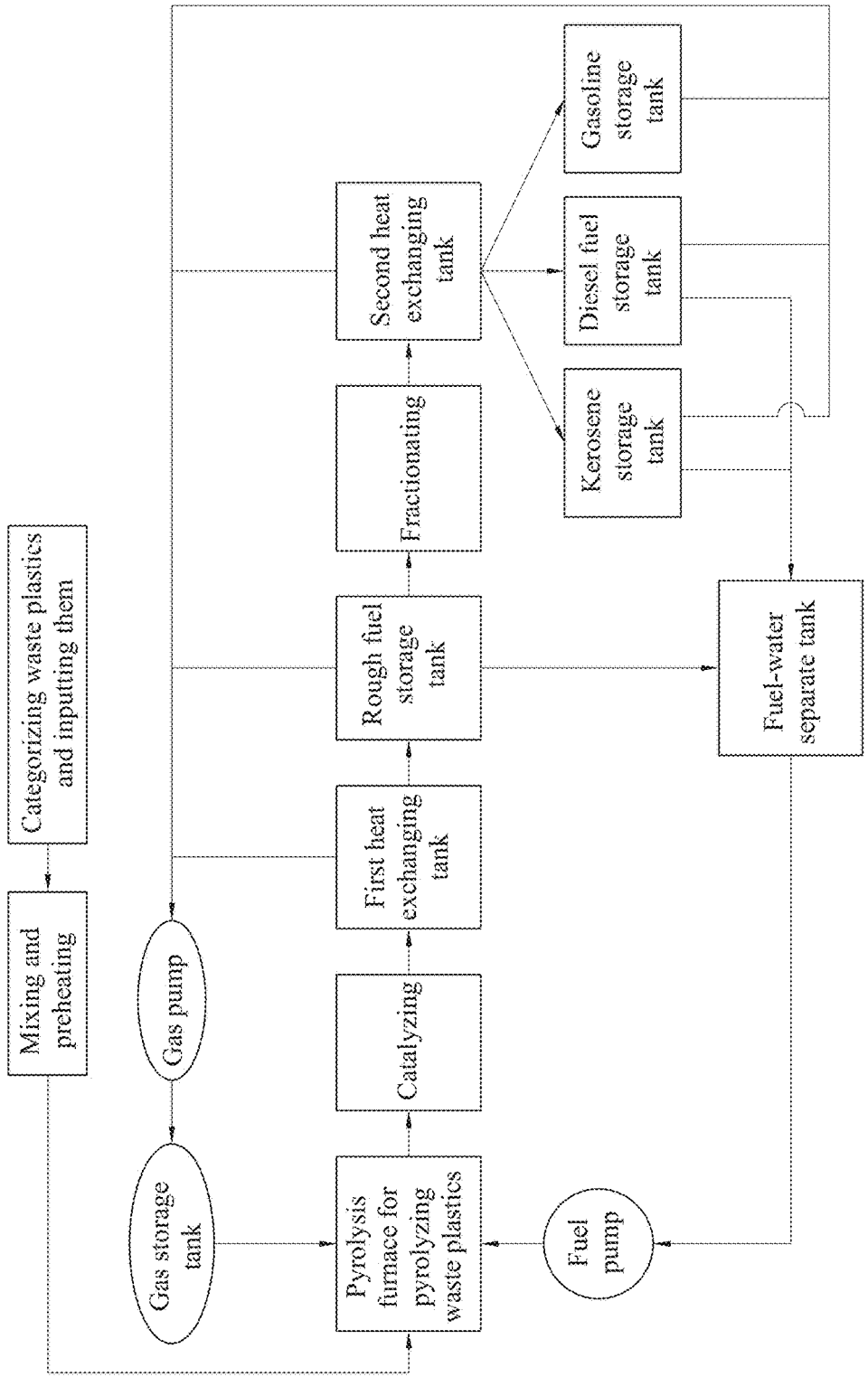
FIG. 1 is an operation flowchart showing the apparatus of the present invention for pyrolyzing waste plastics into fuel.
Figure 2:
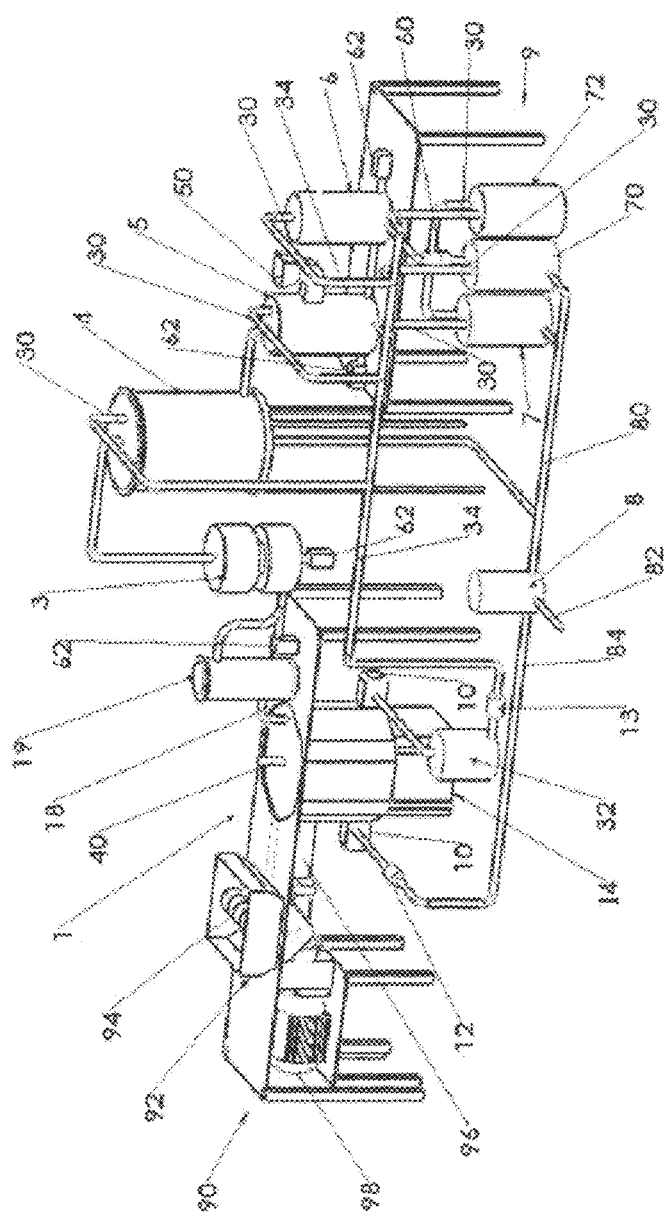
FIG. 2 is a three-dimensional combination chart showing the apparatus of the present invention for pyrolyzing waste plastics into fuel.

Referring to FIGS. 1 and 2, an apparatus for pyrolyzing waste plastics into fuel according to the present invention is illustrated. The apparatus has an input device 90 for categorized wasted plastics to be fed thereinto, a pyrolysis furnace 1 associated with a combustion chamber 10, a catalytic gas tank 19 associated with a temperature controller 62, a first heat exchange tank 3 associated with the temperature controller 62, a rough fuel storage tank 4, a refined fractionation tank 5 associated with the temperature controller 62, a second heat exchange tank 6 associated with the temperature controller 62, a pyrolysis apparatus 9 consisting of all levels of the fuel storage tanks, an equipment for recycling waste fuel generated by the pyrolysis apparatus 9, and a device for recycling combustible gas.

Categories of waste plastics depend on types of waste plastics such as #1-PETE, #2-HPDE, #3-PVC, #4-LDPE, #5-PP, #6-PS, and #7-Other. In those categories, waste plastics of #1-PETE and #3-PVC cannot be pyrolyzed and processed alone because of composition. Since traditional methods are unable to process, a maximum amount of 10% of total waste plastics can be pyrolyzed. The recycled papers are wastes generated by manufacturing operations of paper mills. The residual plastic films of recycled papers belong to the PE category of #2-HPDE and #4-LDPE. Since the shapes of the residual plastic films of recycled papers are particularly difficult to collect and process, they must be compressed into grains to facilitate delivery and comply with the input process for the pyrolysis furnace.

The input device 90 is primarily for feeding waste plastics thereinto which are predetermined to be pyrolyzed into the pyrolysis furnace 1. The input device 90 includes a tank 92 for inputting waste plastic, and two driven and mutually parallel stirring reels 94 disposed within the tank 92 to stir the waste plastic into a preheat pipe 96 disposed beneath the tank 92. The preheat pipe 96 includes a heater 93 for heating the stirred waste plastics to molten liquid. A motor 98 is disposed at the side of the preheat pipe 96 and drives the propeller 95 to feed the molten liquid waste plastics into the pyrolysis furnace 1.

Figure 6:
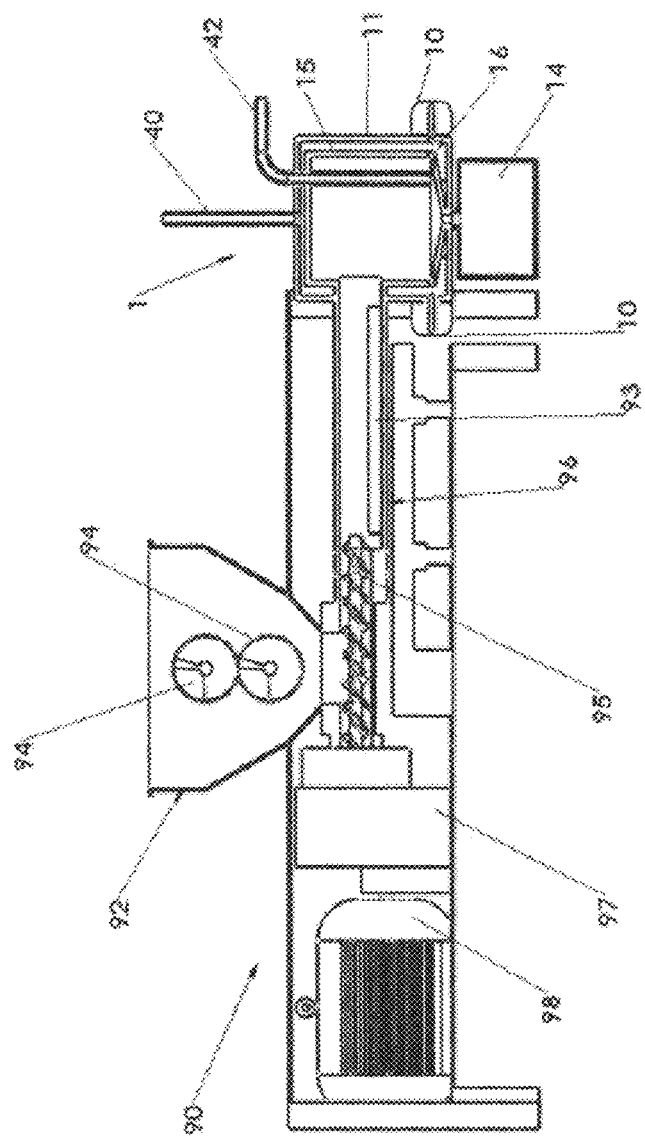
FIG. 6 is a sectional diagram showing the pyrolysis furnace for pyrolyzing waste plastics of the present invention.

The pyrolysis furnace 1 is a two-layered structure having an outer layer surrounding an inner layer with a spacing formed therebetween. The pyrolysis furnace 1 has an inlet disposed at the upper portion of the pyrolysis furnace 1, a hot air outlet 40 disposed at the top end of the outer layer of the pyrolysis furnace 11, a gas pipe 18 disposed at the top end of the inner layer of the pyrolysis furnace 15, two combustion chambers 10 disposed at two corresponding sides of the lower portion of the pyrolysis furnace 1, and a residue tank 14 disposed at the bottom of the pyrolysis furnace 1. The heat is conducted from the outer layer of the pyrolysis furnace 11 to the inner layer of the pyrolysis furnace 15. The molten liquid waste plastics are input into the inner layer of the pyrolysis furnace 15 via an input inlet. The inner layer of the pyrolysis furnace 15 heats up the molten liquid waste plastics under anaerobic to pyrolyze them into gas and residue. The gas is guided out via a gas pipe 18 and the residue is delivered to the residue tank 14 disposed at the bottom of the pyrolysis furnace 1. Burning heat is discharged via the outlet 40 at the top end of the outer layer of the pyrolysis furnace 11 as shown in FIG. 6.

The gas produced by the prolysis furnace 1 is guided out via the gas pipe 18 and fed into the catalytic gas tank 19 associated with the temperature controller 62 to be catalyzed. Next, the gas is fed into the first heat exchange tank 3 associated with the temperature controller 62 to cool down and generate liquid rough fuel. The generated liquid rough fuel is stored in the rough fuel storage tank 4. The first heat exchange tank 3 and rough fuel storage tank 4 contain little residual combustible gas. It is easy to emit the residual combustible gas because the weight of it is light. Depending on manufacturing processes, the rough fuel storage tank 4 contains a portion of fuel mixed with little water. Since the weight of water is heavier, there is an outlet at the bottom of the rough fuel storage tanks 4 to facilitate discharging the fuel mixed with water.

Figure 7:
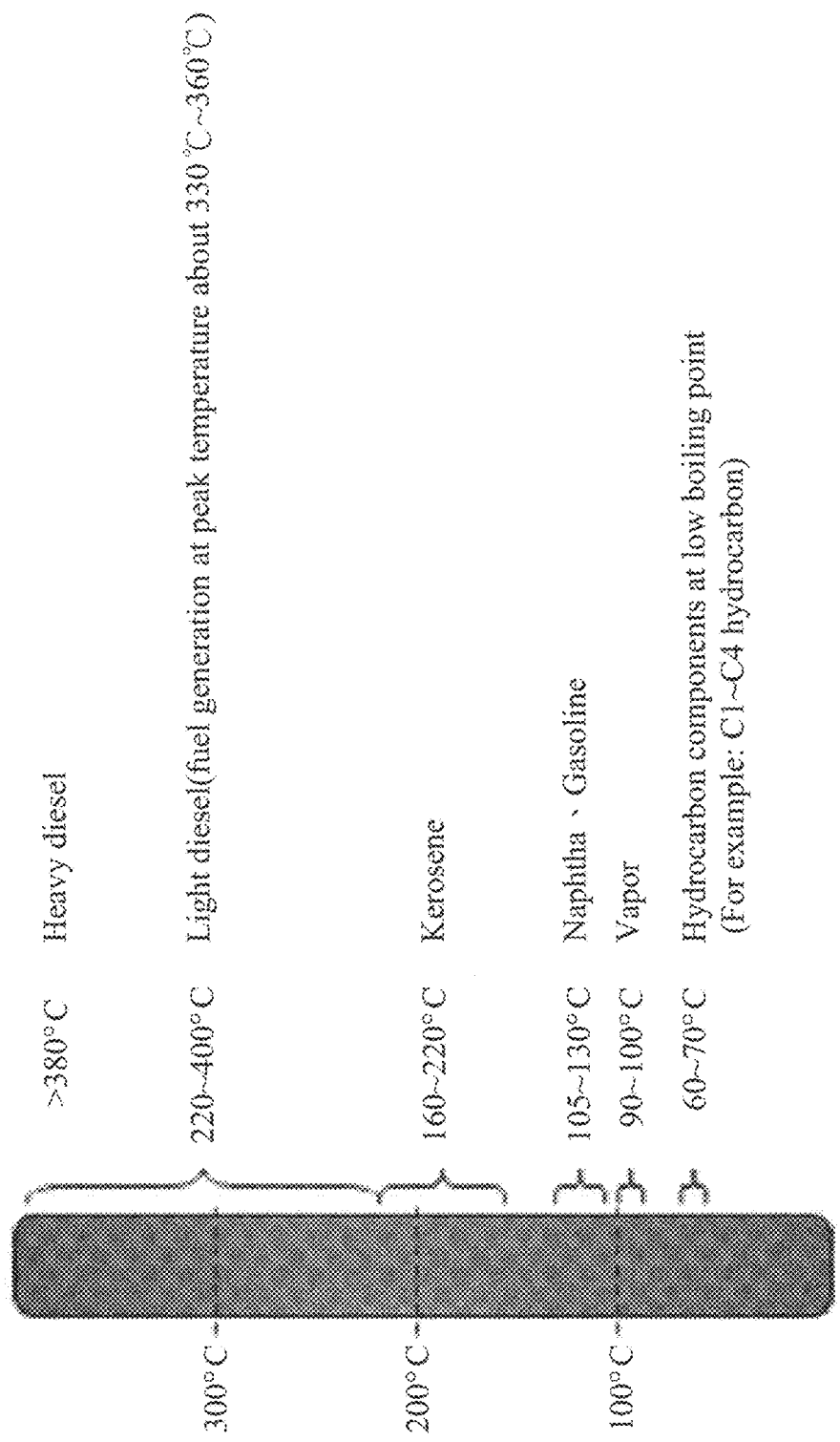
FIG. 7 shows waste plastics are pyrolyzed into levels of fuel in the present invention.

The rough fuel is fed into the refined fractionation tank 5 associated with the temperature controller 62 to refine. The refined fractionation tank 5 includes the additive inlet 50. Based on demands of quality (such as sulfur content, ignition point, or color) of fuel types (such as kerosene, gasoline, or diesel), the additive inlet 50 is allowable to feed appropriate additive into the refined fractionation tank 5. After controlling the refined fractionation tank 5 by the temperature controller 62, the refined fractionation tank 5 feeds the refined fuel to the second heat exchange tank 6 associated with the temperature controller 62 to cool down and then produce desired refined fuel. Based on fuel categories such as kerosene, gasoline, and diesel, the refined fuel is controlled by the valve 60 and then stored in the diesel storage tank 7, the kerosene storage tank 70 or the gasoline storage tank 72 in the storage area 9 as shown in FIG. 7, respectively. The second heat exchange tank 6, the diesel storage tank 7, the kerosene storage tank 70, and gasoline storage tank 72 contain little residual combustible gas. Since the weight of the residual combustible gas is light, a combustible gas outlet 30 is disposed at the top of them to facilitate emission of the residual combustible gas. Furthermore, when diesel and kerosene are produced, a portion of the fuel mixed with water is accordingly formed. Since the weight of the mixture is heavier, an outlet is provided to be disposed at the bottom of the diesel storage tank 7 and the kerosene storage tank 70 to facilitate the discharge of the fuel mixed with water.

Little residual combustible gas which is pyrolyzed, catalyzed, heat exchanged, and refined fractionated in the operating processes, can be recycled by a combustible gas recycling device. The combustible gas recycling device includes a part of at least one of the first heat exchange tank 3 associated with the temperature controller 62, the rough fuel storage tank 4, the second heat exchange tank 6 associated with the temperature controller 62, the diesel storage tank 7, and the kerosene storage tank 70. There is also little residual combustible gas remaining in the combustible gas recycling device. Therefore, there is the combustible gas outlet 30 disposed at the top of at least one of the first heat exchange tank 3, the rough fuel storage tank 4, the second heat exchange tank 6 associated with the temperature controller 62, the diesel storage tank 7, and the kerosene storage tank 70. The combustible gas is fed into the gas storage tank 32 by the combustible gas pipe 34 connected with a gas pump 13 after extracting and pressurizing. The gas storage tank 32 then feeds the combustible gas into the combustion chamber 10 of the pyrolysis furnace 1 to burn again for the purpose of recycling the combustible gas.

During the processes of pyrolysis, catalysis, heat exchange, and refined fractionation process, a portion of fuel is mixed with water to form a waste fuel. The waste fuel can be recycled via a waste fuel recycling device. The waste fuel recycling device has waste fuel pipes 84 connected to outlets disposed at the bottoms of the rough fuel storage tank 4, the diesel fuel storage tank 7, and the kerosene storage tank 70, in order to be further connected to the fuel-water separating tank 8 via the pipe 80. A fuel pump 12 pumps out the waste fuel and then feed it into the combustion chamber 10 of the pyrolysis furnace 1 to burn again for the purpose of recycling the waste fuel.

Referring to FIG. 2, the optimum embodiment of the present invention for pyrolyzing waste plastics into fuel is shown, which includes the input device 90 for feeding in categorized wasted plastics, the pyrolysis furnace 1 associated with the combustion chamber 10, the catalytic gas tank 19 associated with the temperature controller 62, the first heat exchange tank 3 associated with the temperature controller 62, the rough fuel storage tank 4, the refined fractionation tank 5 associated with the temperature controller 62, the second heat exchange tank 6 associated with the temperature controller 62, the fuel storage area 9, the waste fuel recycling device 9 which includes the fuel-water separating tank 8, the waste fuel pipes 84, the pipe 80, the fuel pump 12; and the combustible gas recycling device, which includes the combustible gas pipe 34, the combustible gas outlet 30, the gas pump 13, and the gas storage tank 32.

The input device 90 is mainly for feeding waste plastics which are predetermined to be pyrolyzed into the pyrolysis furnace 1. The input device 90 includes the tank 92 for inputting waste plastic, and two driven and mutually parallel stirring reels 94 disposed within the tank 92 to stir the waste plastic into a preheat pipe 96 disposed beneath the tank 92. The preheat pipe 96 includes the heater 93 for heating the stirred waste plastics to molten liquid. The motor 98 is disposed at the side of the preheat pipe 96 and drives the propeller 95 to feed the molten liquid waste plastics into the pyrolysis furnace 1.

The pyrolysis furnace 1 is a two-layered structure having an outer layer surrounding an inner layer with a spacing formed therein between, and has an inlet disposed at the upper portion of the pyrolysis furnace 1, a hot air outlet 40 disposed at the top end of the outer layer of the pyrolysis furnace 11, a gas pipe 18 disposed at the top end of the inner layer of the pyrolysis furnace 15, two combustion chambers 10 disposed at two corresponding sides of the lower portion of the pyrolysis furnace 1 for heating up the spacing 16, and a residue tank 14 disposed at the bottom of the pyrolysis furnace 1. The heat is conducted from the outer layer of the pyrolysis furnace 11 to the inner layer of the pyrolysis furnace 15. The molten liquid waste plastics are fed into the inner layer of the pyrolysis furnace 15 via an input inlet. The inner layer of the pyrolysis furnace 15 heats up the molten liquid waste plastics under anaerobic to pyrolyze them into gas and residue. The gas is guided out via the gas pipe 18 and the residue is fed into the residue tank 14 at the bottom of the pyrolysis furnace 1. Burning heat is discharged via the outlet 40 at the top of the outer layer of the pyrolysis furnace 11 as shown in FIG. 6.

The gas produced by the prolysis furnace 1 is guided out via the gas pipe 18 and fed into the catalytic gas tank 19 associated with the temperature controller 62 to be catalyzed. Next, the gas is fed into the first heat exchange tank 3 associated with the temperature controller 62 to cool down and generate liquid rough fuel. The generated liquid rough fuel is stored in the rough fuel storage tank 4. The first heat exchange tank 3 and rough fuel storage tank 4 contain little residual combustible gas. It is easy to emit the residual combustible gas because the weight of it is light. Depending on manufacturing processes, the rough fuel storage tank 4 contains fuel mixed with little water. Since the weight of water is heavier, there is an outlet at the bottom of the rough fuel storage tanks 4 to facilitate discharge the fuel mixed with water.

Based on demands of quality (such as sulfur content, ignition point, and color) of fuel types (such as kerosene, gasoline or diesel), the present invention operates a refining process to rough fuel. The refining process is feeding rough fuel into the refined fractionation tank 5 associated with the temperature controller 62. The refined fractionation tank 5 includes an additive inlet 50 to input appropriate additive for deploying customized fuel. After controlling the refined fractionation tank 5 by the temperature controller 62, the refined fractionation tank 5 sends refined fuel to the second heat exchange tank 6 associated with the temperature controller 62 to cool down and then produce desired refined fuel. Based on fuel categories such as kerosene, gasoline, and diesel, the refined fuel is controlled by the valve 60 and then stored in the diesel storage tank 7, the kerosene storage tank 70 or the gasoline storage tank 72 in the storage area 9 as shown in FIG. 7, respectively. The second heat exchange tank 6, the diesel storage tank 7, the kerosene storage tank 70, and gasoline storage tank 72 contain little residual combustible gas. Since the weight of the residual combustible gas is light, there is the combustible gas outlet 30 disposed at the top of them to facilitate emission of the residual combustible gas. Furthermore, when diesel and kerosene are produced, the fuel mixed with water is accordingly produced. Since the weight of the mixture is heavier, an outlet is provided to be disposed at the bottom of the diesel storage tank 7 and the kerosene storage tank 70 to facilitate the discharge of the fuel mixed with water.

There is little residual combustible gas remaining, which is pyrolyzed, catalyzed, heat exchanged, and refined fractionated in the operating processes. The residual combustible gas can be recycled by a combustible gas recycling device which includes the combustible gas pipe 34, the combustible gas outlet 30, the gas pump 13, and the gas storage tank 32. The combustible gas recycling device has a part of at least one of the first heat exchange tank 3 associated with the temperature controller 62, the rough fuel storage tank 4, the second heat exchange tank 6 associated with the temperature controller 62, the diesel storage tank 7, and the kerosene storage tank 70. The combustible gas outlet 30 is disposed at the top of at least one of the first heat exchange tank 3 associated with the temperature controller 62, the rough fuel storage tank 4, the second heat exchange tank 6 associated with the temperature controller 62, the diesel storage tank 7, and the kerosene storage tank 70. The combustible gas is fed into the gas storage tank 32 by the combustible gas pipe 34 connected with the gas pump 13 after extracting and pressurizing. The gas storage tank 32 then feeds the combustible gas into the combustion chamber 10 of the pyrolysis furnace 1 to burn again for the purpose of recycling the combustible gas.

In the processes of pyrolysis, catalysis, heat exchange, and refined fractionation process, a portion of fuel is mixed with water to become a waste fuel. The waste fuel can be recycled via a waste fuel recycling device which includes the fuel-water separating tank 8, the waste fuel pipe 84, the pipe 80, and the fuel pump 12. The waste fuel recycling device has pipes 80 connected to the outlets disposed at the bottom of the rough fuel storage tank 4, the diesel fuel storage tank 7, and the kerosene storage tank 70, respectively. The other ends of the pipes 80 are connected to the fuel-water separate tank 8. There are the waste water outlet 82 and the waste fuel outlet disposed at the bottom of the fuel-water separate tank 8. The waste fuel outlet of the fuel-water separate tank 8 is connected to the waste fuel pipe 84. The waste fuel pipe is connected to the fuel pump 12 for pumping out the waste fuel and then feeding it into the combustion chamber 10 of the pyrolysis furnace 1 to burn again for the purpose of recycling waste fuel.

Figure 3:
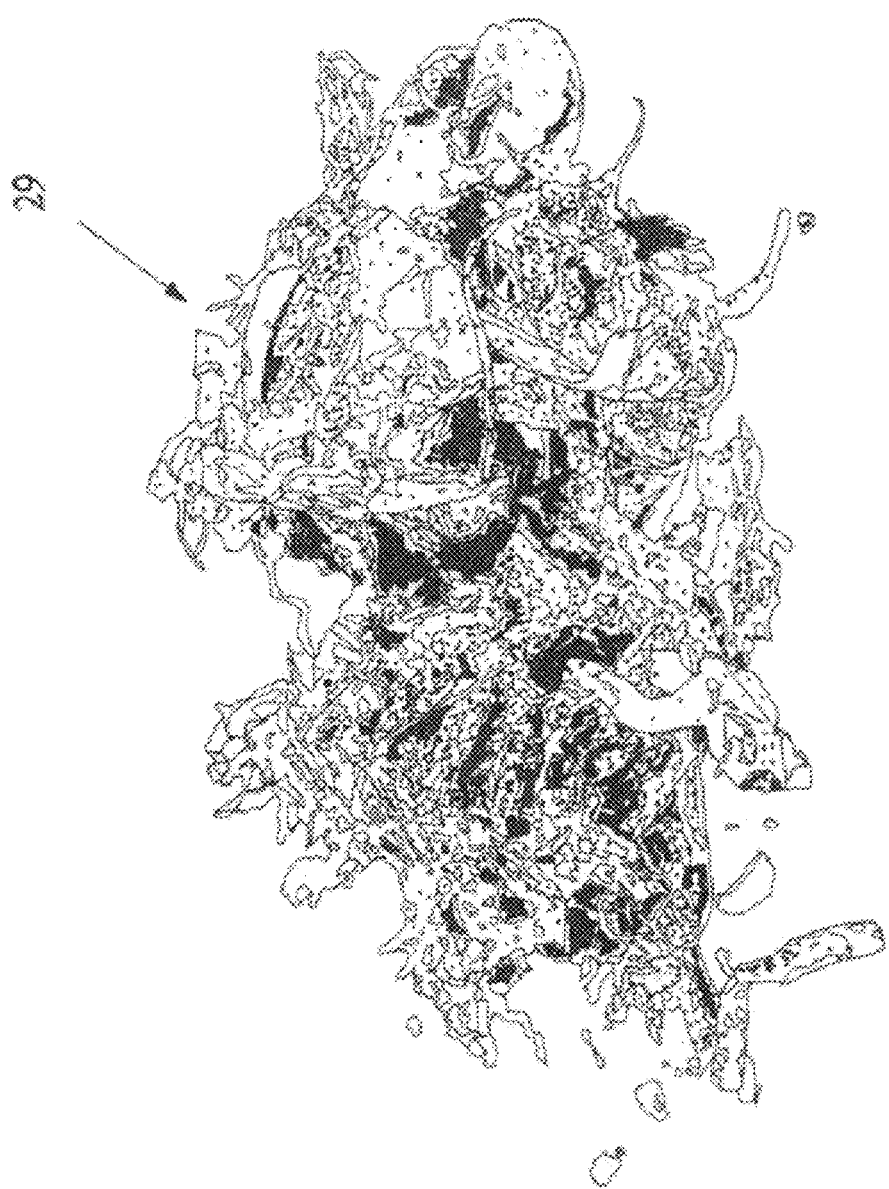
FIG. 3 is a schematic diagram showing residual plastic films of recycled papers.
Figure 4:
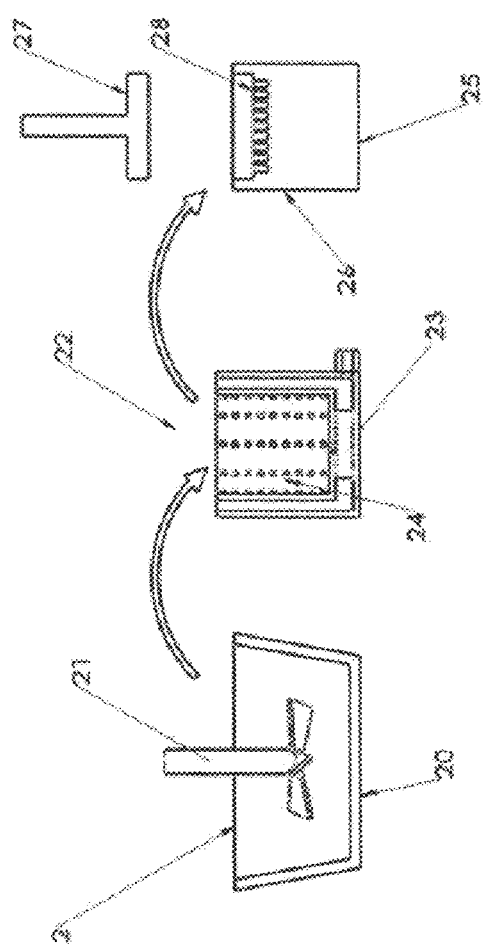
FIG. 4 is a simple cross-sectional diagram showing the compressing structure of the present invention for compressing plastic films of recycled paper into grains.
Figure 5:
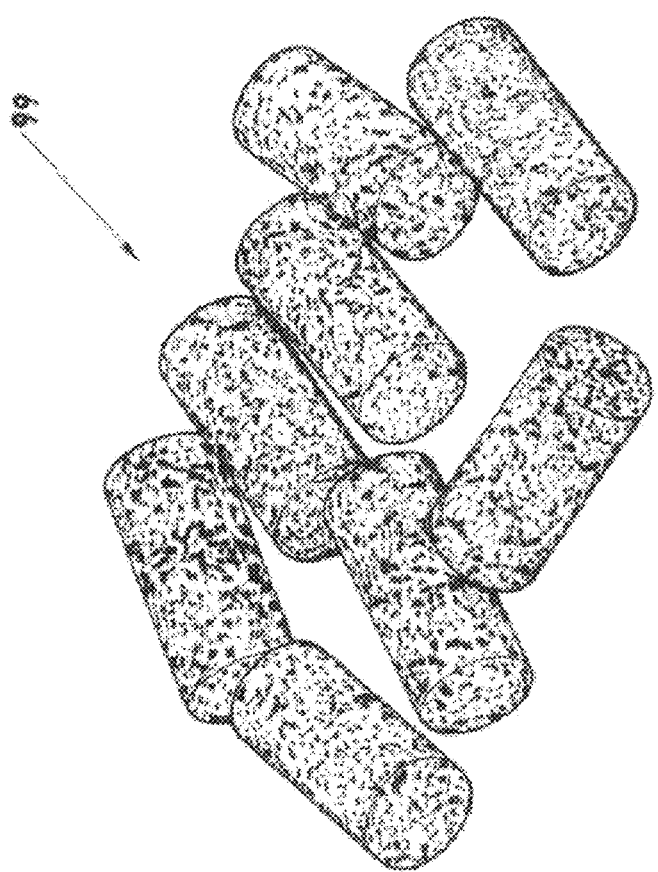
FIG. 5 is a three-dimensional diagram showing the appearance of grains compressed from plastic films of recycled paper in the present invention.

Categories of waste plastics depend on types of waste plastics such as #1-PETE, #2-HPDE, #3-PVC, #4-LDPE, #5-PP, #6-PS, and #7-Other. In those categories, waste plastics of #1-PETE and #3-PVC cannot be pyrolyzed and processed alone because of composition. Since traditional method is unable to process, a maximum amount of 10% of total waste plastics can be pyrolyzed. Wherein the recycled papers are wastes generated by manufacturing operations of paper mills as shown in FIG. 3. The residual plastic films of recycled papers belong to the PE category of: #2-HPDE and #4-LDPE. Since the shapes of the residual plastic films of recycled papers are particularly difficult to collect and process, also they contain residual liquid from processing recycled papers. Accordingly, the residual plastic films of recycled papers must be compressed into grains 99 via the compressor as shown in FIG. 4. A mixer 2 is provided for accommodating the plastic films of recycled papers 29 and mixing them with water. The mixer 2 includes a tank 20 and a driven stirring rod 21 inserted into the rank 20. The residual plastic films of recycled papers 29 is placed into a dehydrator 22 after stirring evenly by the stirring rod 21 and diluting to pure plastics. The dehydrator 22 has an inner tank 24 and an outer tank 23, wherein the inner tank is for accommodating the residual plastic films of recycled papers 29 and driven to generate centrifugal force. A compressor 25 is employed for compressing the plastic films of recycled papers 29 and has a platform 26 formed with a plurality of mold cavities 28 and a driven pressure plate 27. The driven pressure plate 27 is used to heavily compress the plastic films of recycled papers 29 into the grains 99 via the mold cavities 28. That not only greatly compresses the volume of the plastic films of recycled papers 29 but also makes it easy to transport, store, and comply with the operating specifications for inputting into the pyrolysis furnace 1 to pyrolyze and output all levels of fuel as shown in FIG. 5.

What is claimed is:

1. An apparatus for pyrolyzing waste plastics into fuel and inputting categorized waste plastic, the apparatus comprising:
   an input device;
   a pyrolysis furnace associated with a combustion chamber and connected to the input device;
   a catalytic gas tank associated with a first temperature controller and connected to the pyrolysis furnace;
   a first heat exchange tank associated with a second temperature controller connected to the catalytic gas tank;
   a rough fuel storage tank connected to the first heat exchange tank;
   a refined fractionation tank associated with a third temperature controller and connected to the rough fuel storage tank;
   an equipment comprising a second heat exchange tank associated with a fourth temperature controller, the equipment being connected to the refined fractionation tank,
   wherein the input device further includes a tank for inputting waste plastic, and two driven and mutually parallel stirring reels disposed within the tank to stir waste plastics into a preheat pipe disposed beneath the tank, and the preheat pipe includes a heater for heating the stirred waste plastics to molten liquid and a motor-driven propeller for material input,
   wherein the pyrolysis furnace is a two-layered furnace structure having an outer layer surrounding an inner layer with a spacing formed thereinbetween, and the pyrolysis furnace comprises an inlet formed at an upper portion of the pyrolysis furnace for allowing the molten liquid containing waste plastic solids to be input into the pyrolysis furnace, a hot air outlet formed at a top end of the outer layer of the pyrolysis furnace, a gas pipe disposed at a top end of the inner layer of the pyrolysis furnace, two combustion chambers disposed at two corresponding sides of a lower portion of the pyrolysis furnace to heat up the spacing formed between the outer layer and the inner layer, a residue tank disposed at a bottom of the pyrolysis furnace, and wherein a gas generated by the pyrolysis furnace is fed by the gas pipeline into the catalytic gas tank to process and then into the first heat exchange tank to obtain rough fuel, and the rough fuel is stored in the rough fuel storage tank, and then input to the refined fractionation tank which is formed with an additive inlet, the rough fuel is fractionated and then processed by the second heat exchange tank to output refined fuel, the refined fuel is controlled by a valve to be stored in a diesel fuel storage tank, kerosene storage tank, or a gasoline storage tank in a fuel storage area, respectively; the apparatus further comprising a structure for handling grains of residual plastic films of recycled papers, the structure comprising:

a mixer for accommodating the residual plastic films of recycled papers and mixing them with water, wherein the mixer includes a tank and a driven stirring rod inserted into the rank; and a dehydrator having an inner tank and an outer tank and for the residual plastic films of recycled papers after being stirred evenly by the stirring rod and diluted to pure plastics to be fed thereinto, wherein the inner tank is for accommodating the residual plastic flims of recycled papers and driven to generate centrifugal force; and a compressor for compressing the residual plasctic films of recycled papers, and having a platform formed with a plurality of mold cavities and a driven pressure plate, wherein the driven pressure plate is used to heavily compress the residual plastic films of recycled papers from the dehydrator into grains via the several mold cavities.

2. The apparatus of claim 1, further comprising a combustible gas recycling device including a combustible gas pipe, at least a combustible gas outlet, a gas pump, and a gas storage tank for recycling a residual combustible gas, which is pyrolyzed, catalyzed, heat exchanged, and refined fractionated, wherein the combustible gas outlet is disposed at a top of at least one of the first heat exchange tank, the rough fuel storage tank, the second heat exchange tank, the diesel fuel storage tank, and the kerosene storage tank; and the combustible gas outlet is connected with the pump through the combustible gas pipe for inputting the residual combustible gas contained in the at least one of the first heat exchange tank, the rough fuel storage tank, the second heat exchange tank, the diesel fuel storage tank, and the kerosene storage tank to the gas tank connected to the pump after extracting and pressurizing such that the residual combustible gas is fed into the combustion chamber of the pyrolysis furnace through the gas tank to burn again for the purpose of recycling fuel gas.

3. The apparatus of claim 1, wherein during the pyrolysis, catalysis, heat exchange, and refined fractionation processes, a portion of the refined fuel is mixed with water to become a waste fuel, the waste fuel can be recycled through a waste fuel recycling device, wherein the waste fuel recycling device has pipes connected to outlets disposed at the bottom of the rough fuel storage tank, the diesel fuel storage tank, and the kerosene storage tank for discharging the waste fuel through the outlets, the other ends of the pipes are connected with a fuel-water separating tank, a bottom of the fuel-water separating tank is disposed with a waste water outlet and a waste fuel outlet, the waste fuel outlet of the fuel-water separating tank is connected with a waste fuel pipe, the waste fuel pipe is connected with a pump to feed the waste fuel into the pyrolysis furnace for burning so as to recycle the waste fuel.

* * * * *